United States Patent [19]
Reagan et al.

[11] Patent Number: 6,044,923
[45] Date of Patent: Apr. 4, 2000

[54] ELECTRIC POWER GENERATION SYSTEM FOR LIMOUSINE

[76] Inventors: David H. Reagan, 1945 N. McCormack La., Placentia, Calif. 92870; Gregory Beck, 8230 E. Alpine Ct., Anaheim Hills, Calif. 92808

[21] Appl. No.: 08/778,080

[22] Filed: Jan. 2, 1997

[51] Int. Cl.[7] ................................ B60L 1/10; B60R 16/02
[52] U.S. Cl. ..................... 180/65.4; 180/291; 310/112
[58] Field of Search .................................. 180/65.2, 65.3, 180/65.4, 291; 310/112; 290/4 A, 1 R, 16; 307/16, 84; 248/291.1, 292.14, 299.1

[56] References Cited

U.S. PATENT DOCUMENTS

| | | | |
|---|---|---|---|
| 1,929,104 | 10/1933 | Summers | 180/291 |
| 2,085,275 | 6/1937 | Schmidt | 310/112 |
| 2,508,756 | 5/1950 | Jackoboice | 290/1 R |
| 3,367,438 | 2/1968 | Moore | 180/65.2 |
| 3,719,881 | 3/1973 | Shibata et al. | 180/65.4 |
| 4,348,628 | 9/1982 | Loucks | 290/16 |
| 4,602,694 | 7/1986 | Weldin | 180/65.3 |
| 4,757,249 | 7/1988 | Farber et al. | 307/84 |
| 5,097,165 | 3/1992 | Mashino et al. | 310/112 |
| 5,215,156 | 6/1993 | Stulbach et al. | 180/65.3 |

FOREIGN PATENT DOCUMENTS

| | | | |
|---|---|---|---|
| 2559438 | 3/1977 | Germany | 180/65.3 |

*Primary Examiner*—J. J. Swann
*Assistant Examiner*—Frank Vanaman
*Attorney, Agent, or Firm*—John J. Connors; Connors & Assoc.

[57] ABSTRACT

A limousine type vehicle includes a standard electrical system, a coach section with an auxiliary electrical system, and an electric power generation system which has first and second batteries isolated from each other during normal operation of the vehicle's engine. The first battery is electrically connected to the engine to supply electric power for the operation of the engine and the standard electrical system, and the second battery is electrically connected to the auxiliary electrical system to supply electric power for the operation of said auxiliary electrical system. A first alternator is electrically connected to the first battery to recharge said first battery during operation of the engine, and a second alternator is electrically connected to the second battery to recharge said second battery during operation of the engine. These alternators are electrically isolated from each other during normal operation of the engine, and they are mechanically coupled together and to the engine, so that the operation of the engine drives both the first and second alternators simultaneously.

3 Claims, 3 Drawing Sheets

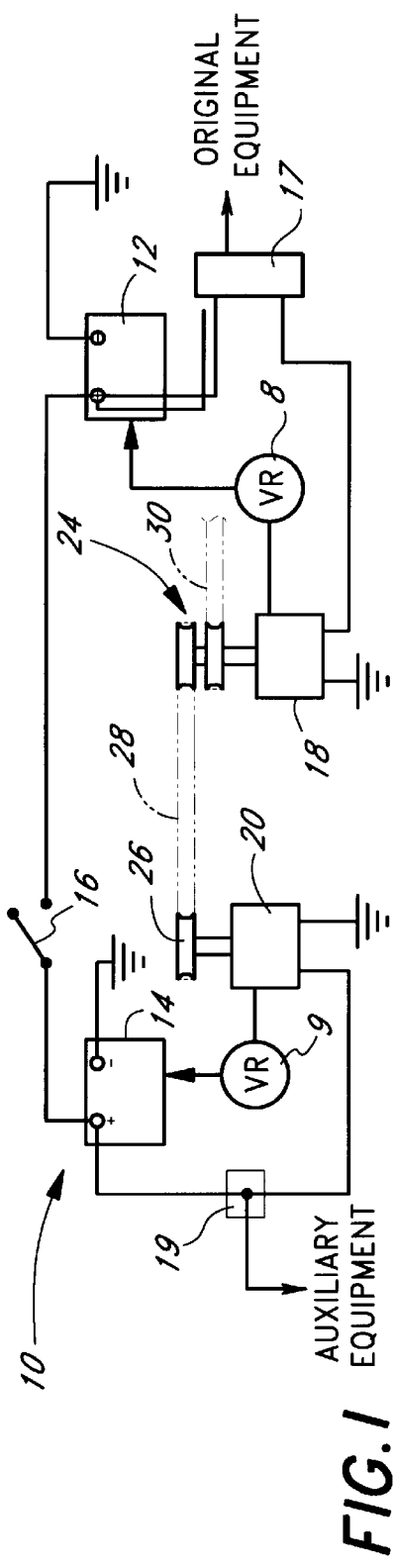
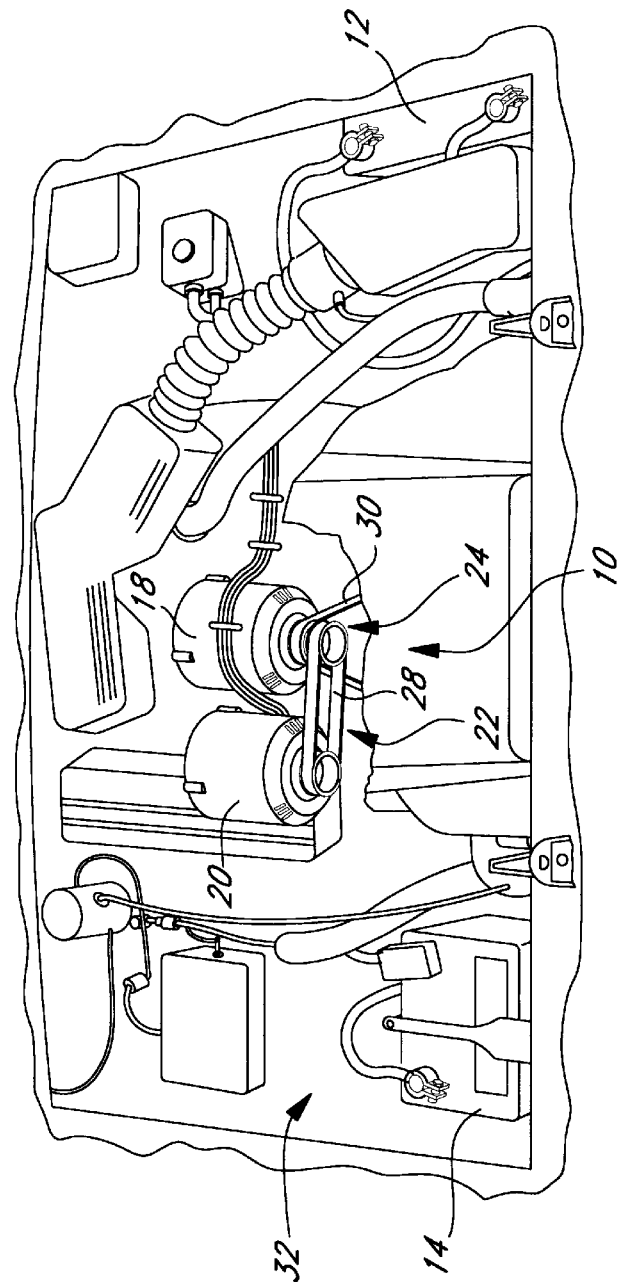
FIG. 1
FIG. 2

ELECTRIC POWER GENERATION SYSTEM FOR LIMOUSINE

BACKGROUND OF THE INVENTION

1. Field of the Invention

This invention relates to an electric power generation system for a limousine which ensures adequate electrical power for the auxiliary electrical systems commonly found in limousines and in emergency situations.

2. Background Discussion

Limousines are well-known, and they are ordinarily manufactured by "stretching" conventional luxury automobiles. A standard vehicle such as, for example, a Lincoln Town Car, is converted into a limousine by, in effect, cutting the passenger section of the vehicle in half and enlarging it, converting it into what is referred to in the industry as a coach. This coach includes extra electrical equipment such as a stereo, lights, television, audio and video cassette players, computers, additional air conditioning, and other electrical auxiliary devices which are in addition to the standard electrical equipment commonly found in luxury automobiles. Use of such auxiliary electrical equipment places a burden on the standard electric power generation system of the vehicle, and frequently the limousine, particularly when idling, does not generate enough electricity to supply these additional components with the electrical energy required without placing an undue burden on the battery. Consequently, the limousine frequently becomes inoperable because the battery dies.

SUMMARY OF THE INVENTION

It is the objective of this invention to provide an electrical power generation system for a limousine which obviates this problem.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include a reliable source of electrical power for a limousine type vehicle, ease of installation, and avoidance of overload of the battery of a limousine type vehicle.

The first feature of the electric power generation system of this invention is that it includes first and second batteries which are electrically isolated from each other during normal operation of the engine. The first battery is electrically connected to the engine of the limousine to supply electric power for the operation of the limousine's engine and the standard electrical system. The second battery is electrically connected to the auxiliary electrical system to supply electric power for the operation of the auxiliary electrical system. A manually operated switching mechanism is provided to enable the first and second batteries to be electrically coupled together in case of an emergency, and each battery preferably has a cold cranking capability of at least 550 amperes and a reserve capacity of at least 90 minutes. Typically, the rotational speeds of the drive shafts of the alternators ranges from about 2000 to about 9000 revolutions per minute.

The second feature of the electric power generation system of this invention is that it includes first and second alternators which are electrically isolated from each other during normal operation of the engine. The first alternator is electrically connected to the first battery to recharge the first battery during operation of the engine, and the second alternator is electrically connected to the second battery to recharge the second battery during operation of the engine. The first and second alternators are mechanically coupled together and to the engine, so that the operation of the engine drives both the first and second alternators simultaneously.

The third feature is that each alternator has a drive shaft with a pulley attached to the drive shaft, and a drive belt is operatively connected to the pulleys, so that when the drive shaft of one of the alternator is driven by the engine, the drive belt is turned to drive the other alternator. The first and second alternators are next to each other and connected together by an adjustment bracket. At least one of said alternators includes a mounting member having one end mounted to pivot and another end connected to the adjustment bracket at a selected variable position which regulates tension in the drive belt.

BRIEF DESCRIPTION OF THE DRAWINGS

The preferred embodiment of this invention, illustrating all its features, will now be discussed in detail. This embodiment depicts the novel and non-obvious electric power generation system of this invention as shown in the accompanying drawing, which is for illustrative purposes only. This drawing includes the following figures (Figures), with like numerals indicating like parts:

FIG. 1 is a schematic diagram of the electric power generation system of this invention.

FIG. 2 is a perspective view looking inside the engine compartment of a limousine, showing the position of the alternators and batteries used in the electrical power generation system of this invention.

DESCRIPTION OF THE PREFERRED EMBODIMENT

Figure 3:
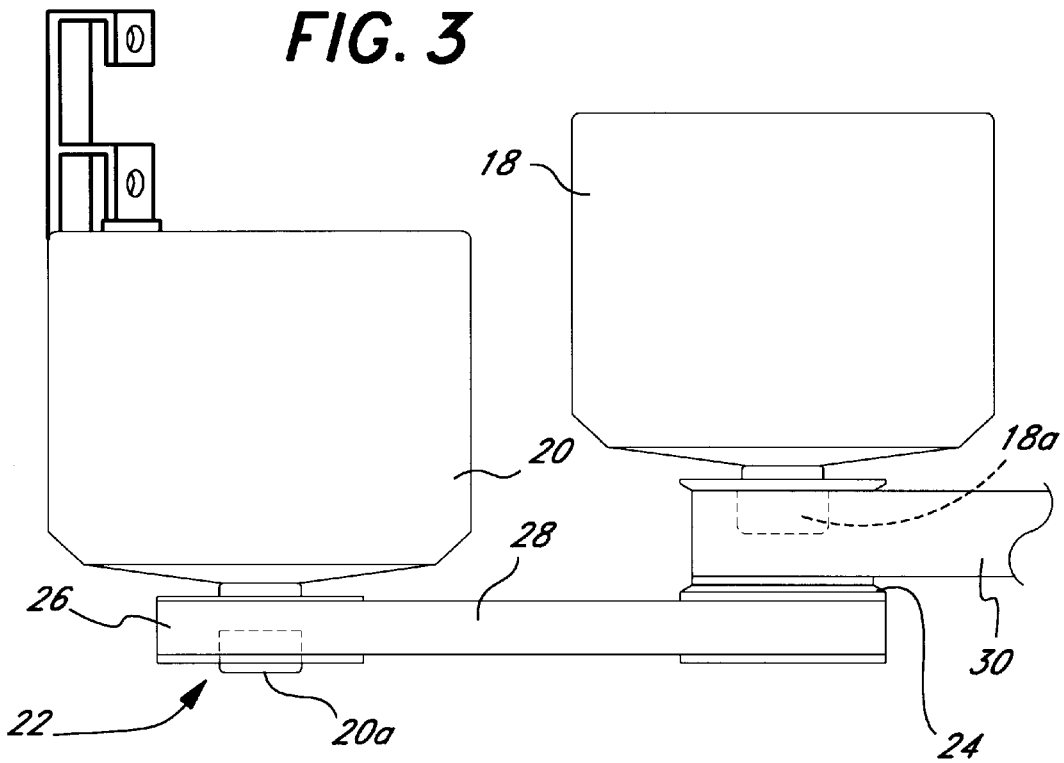
FIG. 3 is a top view showing the position of the two alternators used in the electrical power generation system of this invention.

As best shown in FIGS. 1 and 2, the electrical power generation system 10 of this invention employs two batteries, a standard battery 12 which comes with the vehicle, and an auxiliary battery 14. Ordinarily these two batteries 12 and 14 are electrically isolated, but in case of an emergency, the batteries may be connected together through a manually operated switch 16 that connects the positive pole of the auxiliary battery to the positive pole of the standard battery.

Figure 4:
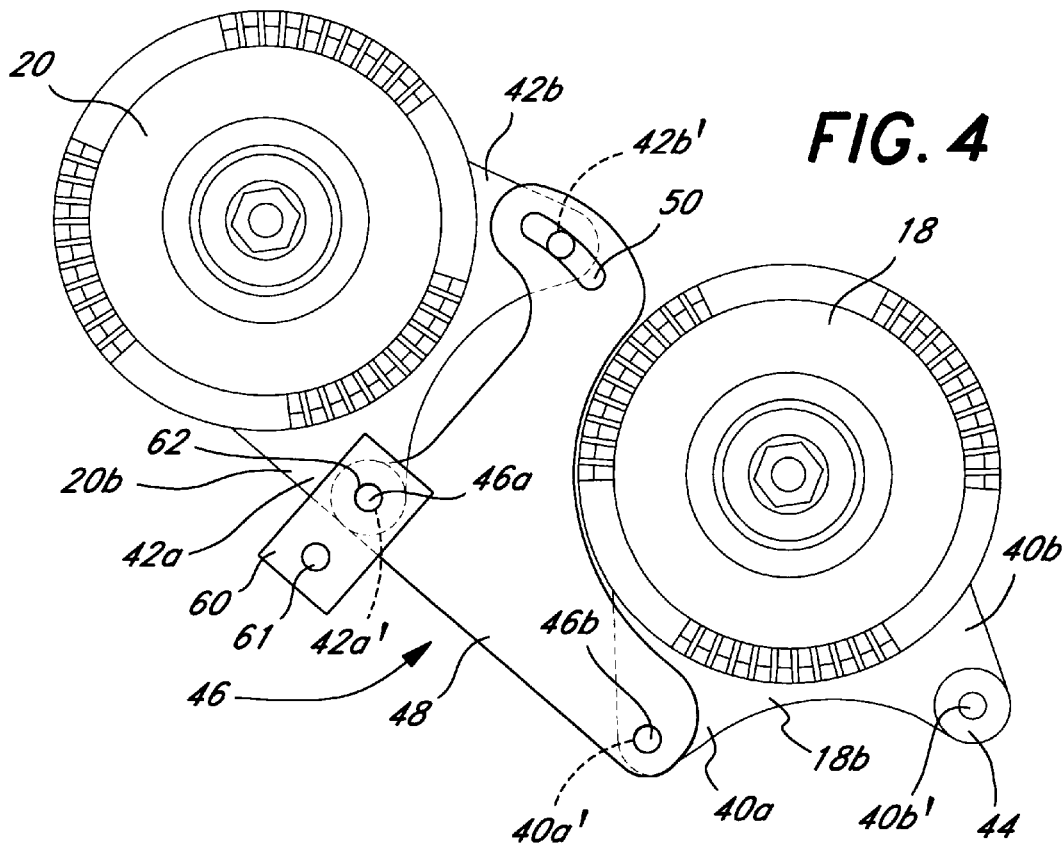
FIG. 4 is a front view of the alternators shown in FIG. 3.
Figure 6:
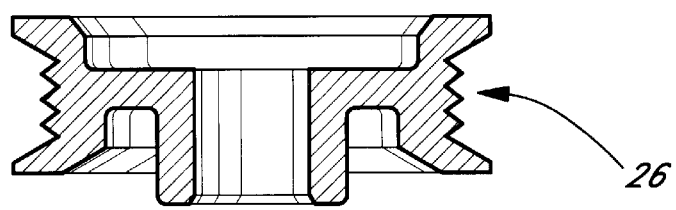
FIG. 6 is a cross-sectional view of a single-track pulley used in the electric power generation system of this invention.
Figure 7:
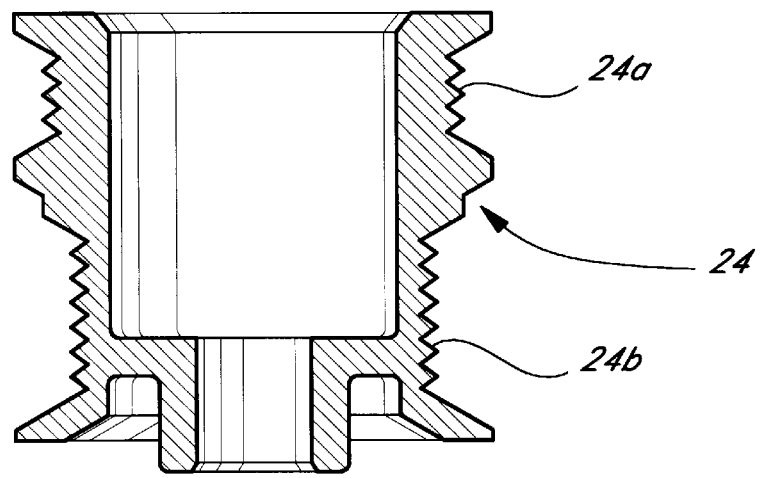
FIG. 7 is a cross-sectional view of the two-track pulley used in the electric power generation system of this invention.

Two alternators are used, a standard alternator 18 which comes with the vehicle that charges the standard battery 12, and an auxiliary alternator 20 which is used to charge the auxiliary battery 14. These two alternators 18 and 20 are mechanically coupled together through a belt and pulley mechanism 22, as best shown in FIGS. 3 and 4. The positive pole of the standard battery 12 is connected through a standard power distribution box 17 provided with the original vehicle to the alternator 18, and the positive pole of the auxiliary battery 14 is connected through an insulated power junction 19 to the auxiliary alternator 20. The electric power is distributed, respectively, to original equipment through the power distribution box 17 and to the auxiliary equipment in the coach section through the insulated power junction 19.

Each alternator 18 and 20 has a drive shaft 18a and 20a, respectively, and a voltage regulator 8 and 9, respectively. The voltage regulators are standard equipment which regulate the voltage of the batteries to which they are connected. There is a two-track pulley 24 attached to the drive shaft 18a of the standard alternator 18, and a single-track pulley 26 attached to the drive shaft 20a of the auxiliary alternator 20. A secondary drive belt 28 connects the two pulleys 24 and 26 together, and a primary drive belt 30 is connected to the two-track pulley 24 and the crank shaft (not shown) of the limousine's engine 32. The primary drive belt 30 is wrapped around the one track 24b of the two-track pulley 24, and the secondary drive belt 28 is wrapped around the other track 24a of the two-track pulley 24 and the single track pulley 26. Thus, as the engine 32 turns, the primary drive belt 30 turns the drive shaft 18a of the standard alternator 18 to recharge the standard battery 12. Simultaneously, the rotation of the two-track pulley 24 causes the secondary drive belt 28 to revolve, turning the drive shaft 20a of the auxiliary alternator 20 to recharge the auxiliary battery 14.

Figure 5:
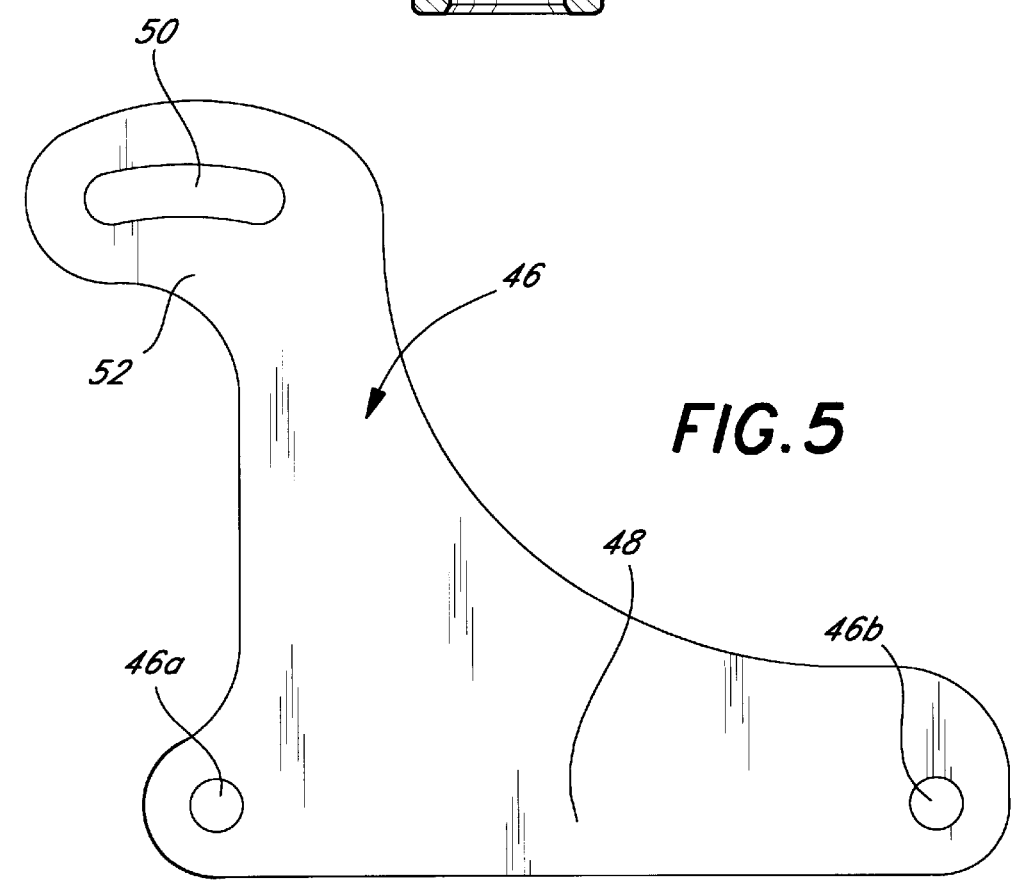
FIG. 5 is a plan view of an L-shaped adjustment bracket used to connect the alternators together.

As best shown in FIG. 4, each alternator 18 and 20 includes, respectively, a mounting plate 18b and 20b, with opposed arms 40a and 40b, and 42a and 42b, respectively. At the ends of each of these arms 40a, 40b, 42a, and 42b, are openings 40a', 40b', 42a' and 42b', respectively. As best shown in FIG. 5, an L-shaped adjustment bracket 46 connects the alternators 18 and 20 together. This L-shaped adjustment bracket 46 has two opposed openings 46a and 46b along its base 48, and an elongated slot 50 in its upper leg portion 52.

The mounting plate 18b of the standard alternator 18 is fixed to a mount 44 in the engine 32 by a bolt (not shown) which passes through the opening 40b' in the arm 40b into a treaded opening (not shown) in the mount 44. The other arm 40a of the mounting plate 18b is attached to the L-shaped adjustment bracket 46 and another mount (not shown) in the engine 32. The opening 40a' of the arm 40a is aligned with the opening 46b in the L-shaped adjustment bracket 46 and a bolt (not shown) connects the mounting plate 18b to the L-shaped adjustment bracket in a fixed, immovable position. The auxiliary alternator 20 has its mounting plate 20b attached by the one arm 20b pivotally to the L-shaped adjustment bracket 46 and a mounting bracket 60 in the engine. The mounting bracket 60 has a pair of orifices 61 and 62. A stud (not shown) on the engine 32 passes through the orifice 61 and a nut (not shown) attached to the end of the stud fixedly secures the mounting bracket 60 to the engine 32. The orifice 62, the opening 42a' in the mounting plate 42, and the opening 46a of the L-shaped adjustment bracket 46 are aligned and a bolt (not shown) connects the plate 20b, the mounting bracket 60, and L-shaped adjustment bracket together, allowing these members to pivot relative to each other during installation so that the proper tension in the secondary drive belt 28 may be provided. The hole 42b' is aligned with the elongated slot 50 in the L-shaped adjustment bracket 46, and as the position of the alternator 20 is adjusted during installation, this hole moves its relative position to the slot as required to regulate the tension in the drive belt 28. Consequently, the mounting plate 20b of the alternator 20 has its arm 42a mounted to pivot and its other arm 42b connected to the L-shaped adjustment bracket 46 at a selected variable position which regulates the tension in the drive belt 28.

In operation, when the engine 32 is started, the primary drive 30 belt turns the drive shaft 18a of the standard alternator 18, and the secondary drive belt 28 turns the drive shaft 20a of the auxiliary alternator 20 to charge simultaneously both the standard battery 12 and the auxiliary battery 14. Because the manually operated switch 16 is normally open, each battery 12 and 14, independent of the other battery, provides power to the components connected to it. The standard components found in the limousine are connected to the standard battery 12, such as for example, blowers, engine ignition system, OEM air conditioner, windshield wipers, power locks and windows, etc. The auxiliary equipment in the coach section of the limousine is powered by the electricity provided by the auxiliary battery 14.

It is possible, particularly when a limousine is parked with the engine idling, and all the auxiliary equipment is operational, that the battery of a conventional system would discharge and the engine would die because there is inadequate electrical energy provided for the operation of the engine. In the present system, since each battery is independently recharged by its own alternator, it is very unlikely that electrical power would not be available to start the engine 32. If for any reason the standard battery 12 dies and the engine 32 cannot be started, the manual switch 16 may be closed, allowing the auxiliary battery 14 to be used to operate the starter motor (not shown) for the engine 32. When the manual switch 16 is closed, the alternators 18 and 20 are no longer electrically isolated from each other. Since this condition prevails only during use of the auxiliary battery 14 in an emergency situation, and the switch 16 is opened after the engine 32 has been started using the auxiliary battery 14, there is no problem. If, however, the alternators 18 and 20 were to remain electrically coupled together for a prolonged duration, it is possible that the voltage regulators 8 and 9 would interact with the computer control system (not shown) for the engine 32, interfering with the idle or other operational parameters of the engine. Since in normal use the alternators 18 and 20 are electrically isolated, this interference with the computer control of the engine 32 does not occur in the present invention.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

We claim:

1. A vehicle, including an engine which drives the vehicle, a standard electrical system, a coach section with an auxiliary electrical system, and an electric power generation system including a first battery electrically connected to supply electric power for the operation of the engine and the standard electrical system, a second battery electrically connected to the auxiliary electrical system to supply electric power for the operation of said auxiliary electrical system, said first and second batteries being electrically isolated from each other during normal operation of the engine, a manually operated switching mechanism that enables the first and second batteries to be electrically coupled together in case of an emergency, a first alternator driven by the engine and electrically connected to the first battery to recharge said first battery during operation of the engine, said first alternator having a first drive shaft with a first pulley attached to the first drive shaft, and a second alternator electrically connected to the second battery to recharge said second battery, said second alternator having a second drive shaft with a second pulley attached to the second drive shaft, a drive belt operatively connected to the first and second pulleys, so that when the first drive shaft of the first alternator is driven by the engine, the drive belt is turned to drive the second alternator, said first and second alternators being electrically isolated from each other during normal operation of the engine and being next to each other and connected together by an adjustment bracket, at least one of said alternators including a mounting member having one end mounted to pivot and another end connected to the adjustment bracket at a selected variable position which regulates tension in the drive belt, whereby the operation of the engine drives both said first and second alternators simultaneously and at the same rotational speed.

2. The vehicle of claim 1 where each battery has a cold cranking capability of at least 550 amperes and a reserve capacity of at least 90 minutes.

3. The vehicle of claim 1 where the alternator drive shafts have rotational speeds of from 2000 to 9000 revolutions per minute.

\* \* \* \* \*